United States Patent
Redfern (10) Patent No.: US 7,403,569 B2
(45) Date of Patent: Jul. 22, 2008

(54) EFFICIENT LOW-POWER MODE FOR MULTICARRIER COMMUNICATIONS

(75) Inventor: Arthur J. Redfern, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 740 days.

(21) Appl. No.: 11/044,861

(22) Filed: Jan. 27, 2005

(65) Prior Publication Data

US 2005/0169392 A1    Aug. 4, 2005

Related U.S. Application Data

(60) Provisional application No. 60/541,331, filed on Feb. 3, 2004.

(51) Int. Cl.
*H04K 1/10* (2006.01)
(52) U.S. Cl. .................... 375/260; 375/260; 375/295
(58) Field of Classification Search ............ 375/260, 375/219, 220, 295
See application file for complete search history.

(56) References Cited

U.S. PATENT DOCUMENTS

| | | | |
|---|---|---|---|
| 6,771,697 B1 * | 8/2004 | Goldstein et al. ........... | 375/222 |
| 7,352,770 B1 * | 4/2008 | Yonge et al. ................ | 370/445 |
| 2002/0176509 A1 | 11/2002 | Gatherer et al. | |
| 2003/0031240 A1 | 2/2003 | Redfern et al. | |
| 2003/0039306 A1 | 2/2003 | Redfern | |

OTHER PUBLICATIONS

Henkel et al., "Another Application for Trellis Shaping: PAR Reduction for DMT (OFDM)", Transactions on Communicaitons, vol. 48, No. 5 (IEEE, Sep. 2000), pp. 1471-1476.
Gatherer et al., "Controlling clipping probability in DMT transmission", Proceedings of the Asilomar Conference on Signals, Systems, and Computers, (1997), pp. 578-584.
Redfern, "A comparison of transparent physical layer Q-mode proposals", submitted to St. Gr. 15, ques. 4, ITU Telecommunications Stand. Sector, Document RN-083 (May 2001).
Odling et al., "How Much PAR to Bring to the Party?", NORSIG-2002, 5th Nordic Signal Processing Symposium (Oct. 2002).

* cited by examiner

*Primary Examiner*—Emmanuel Bayard
(74) *Attorney, Agent, or Firm*—Steven A. Shaw; W. James Brady; Frederick J. Telecky, Jr.

(57) ABSTRACT

Multicarrier modulated communications, involving a transmitting modem (30; 30') and a receiving modem (40; 40') that operate according to normal operating mode and a low-power, quiescent, mode, are disclosed. In the quiescent mode, transmitter power is saved by scaling down the amplitude of the transmitted symbols in each frame by a scaling factor (A), and transmitting multiple instances of the frames in sequence. On receipt, the repeated frames are summed, and the summed amplitudes scaled to account for the repetition factor (M) and the scaling factor (A), to recover the transmitted information. If the repetition factor (M) is greater than or equal to the square of the scaling factor (A), the signal-to-noise ratio in quiescent mode is at least as high as that in normal operation. The repeating, scaling, and summing may all be performed in the frequency domain or in the time domain, as desired.

22 Claims, 5 Drawing Sheets

EFFICIENT LOW-POWER MODE FOR MULTICARRIER COMMUNICATIONS

CROSS-REFERENCE TO RELATED APPLICATIONS

This application claims priority, under 35 U.S.C. §119(e), of Provisional Application No. 60/541,331, filed Feb. 3, 2004.

STATEMENT REGARDING FEDERALLY SPONSORED RESEARCH OR DEVELOPMENT

Not applicable.

BACKGROUND OF THE INVENTION

This invention is in the field of digital communications, and is more specifically directed to power reduction techniques in communications involving multiple frequency bands.

An important and now popular modulation standard for digital subscriber line (DSL) communications is Discrete Multitone (DMT). According to DMT technology, the available spectrum is subdivided into many subchannels (e.g., 256 subchannels of 4.3125 kHz). Each subchannel is centered about a carrier frequency that is phase and amplitude modulated, typically by Quadrature Amplitude Modulation (QAM), in which each symbol value is represented by a point in the complex plane; the number of available symbol values depends, of course, on the number of bits in each symbol. During initialization of a DMT communications session, the number of bits per symbol for each subchannel (i.e., the "bit loading") is determined according to the noise currently present in the transmission channel at each subchannel frequency and according to the transmit signal attenuation at that frequency. For example, relatively noise-free subchannels may communicate data in ten-bit to fifteen-bit symbols corresponding to a relatively dense QAM constellation (with short distances between points in the constellation), while noisy channels may be limited to only two or three bits per symbol (to allow a greater distance between adjacent points in the QAM constellation). Indeed, some subchannels may not be loaded with any bits, because of the noise and attenuation in those channels. In this way, DMT maximizes the data rate for each subchannel for a given noise condition, permitting high speed access to be carried out even over relatively noisy twisted-pair lines.

Figures 1, 2:
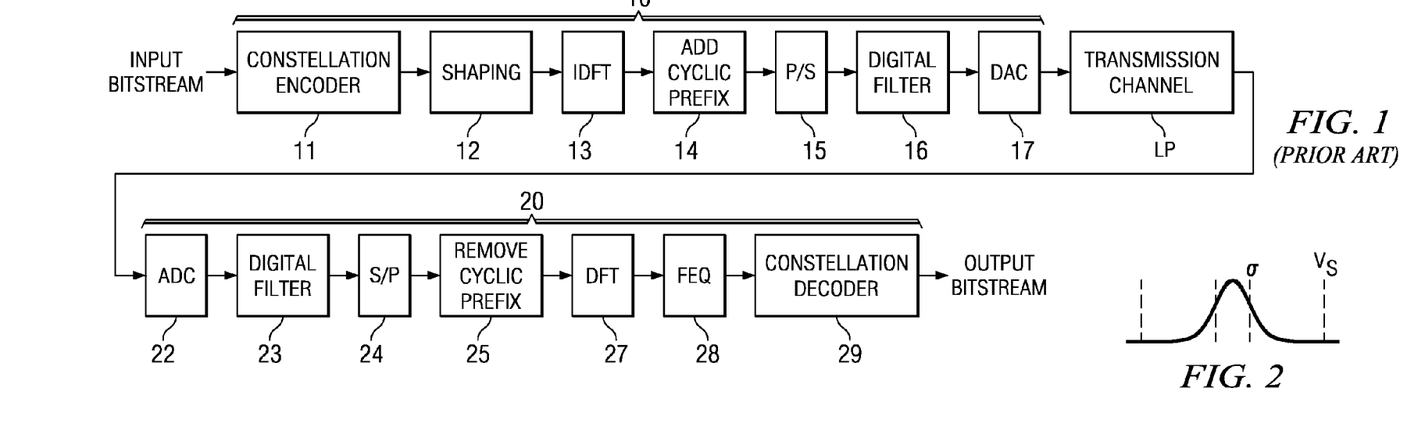
FIG. 1 is a data flow diagram, in block form, illustrating conventional DSL communications functions at the transmitter and receiver.
FIG. 2 is a plot of a Gaussian amplitude probability distribution as typical for multicarrier modulated signals.

FIG. 1 illustrates the data flow in conventional DSL communications, for a given direction (e.g., downstream, from a central office "CO" to customer premises equipment "CPE"). Typically, each DSL transceiver (i.e., both at the CO and also in the CPE) includes both a transmitter and a receiver, so that data is also communicated in the opposite direction over transmission channel LP according to a similar DMT process. As shown in FIG. 1, the input bitstream that is to be transmitted, typically a serial stream of binary digits in the format as produced by the data source, is applied to constellation encoder 11 in a transmitting modem 10. Constellation encoder 11 fundamentally groups the bits in the input bitstream into multiple-bit symbols that are used to modulate the DMT subchannels, with the number of bits in each symbol determined according to the bit loading assigned to its corresponding subchannel, based on the characteristics of the transmission channel as mentioned above. Encoder 11 may also include other encoding functions, such as Reed-Solomon or other forward error correction coding, trellis coding, turbo or LDPC coding, and the like. The symbols generated by constellation encoder 11 correspond to points in the appropriate modulation constellation (e.g., QAM), with each symbol associated with one of the DMT subchannels. Following constellation encoder 11, shaping function 12 derives a clip prevention signal included in the encoded signals to be modulated, to reduce the peak-to-average ratio (PAR) as transmitted as described in copending application Ser. No. 10/034,951, filed Dec. 27, 2001, published on Nov. 28, 2002 as U.S. Patent Application Publication No. 2002/0176509, incorporated herein by this reference.

The encoded symbols are applied to inverse Discrete Fourier Transform (IDFT) function 13, which associates each symbol with one subchannel in the transmission frequency band, and generates a corresponding number of time domain symbol samples according to the Fourier transform. As known in the art, cyclic insertion function 14 appends a cyclic prefix or suffix, or both, to the modulated time-domain samples from IDFT function 13, and presents the extended block of serial samples to parallel-to-serial converter 15. In ADSL2+ and VDSL, cyclic prefix and suffix insertion, and transmitter windowing, are combined into a single cyclic insertion function 14, which preferably operates on the modulated data in parallel form as shown; in ADSL, cyclic insertion function 14 preferably follows serial-to-parallel conversion, and simply prepends a selected number of sample values from the end of the block to the beginning of the block. Following conversion of the time-domain signal into a serial sequence by converter 15, and such upsampling (not shown) as appropriate, digital filter function 16 then processes the digital datastream in the conventional manner to remove image components and voice band or ISDN interference. The filtered digital datastream signal is then converted into the analog domain by digital-to-analog converter 17. After conventional analog filtering and amplification (not shown), the resulting DMT signal is transmitted over a channel LP, over some length of conventional twisted-pair wires, to a receiving DSL modem 20, which, in general, reverses the processes performed by the transmitting modem to recover the input bitstream as the transmitted communication.

At receiving DSL modem 20, analog-to-digital conversion 22 then converts the filtered analog signal into the digital domain, following which conventional digital filtering function 23 is applied to augment the function of pre-conversion receiver analog filters (not shown). A time domain equalizer (TEQ) (not shown) may apply a finite impulse response (FIR) digital filter that effectively shortens the length of the impulse response of the transmission channel LP. Serial-to-parallel converter 24 converts the datastream into a number of samples (2N) for application to Discrete Fourier Transform (DFT) function 27, after removal of the cyclic extension from each received block in function 25. At DFT function 27, the modulating symbols at each of the subchannel frequencies are recovered by reversing the IDFT performed by function 12 in transmission. The output of DFT function 27 is a frequency domain representation of the transmitted symbols multiplied by the frequency-domain response of the effective transmission channel. Frequency-domain equalization (FEQ) function 28 divides out the frequency-domain response of the effective channel, recovering the modulating symbols. Constellation decoder function 29 then resequences the symbols into a serial bitstream, decoding any encoding that was applied in the transmission of the signal and producing an output bitstream that corresponds to the input bitstream upon which the transmission was based. This output bitstream is then forwarded to the client workstation, or to the central office network, as appropriate for the location.

The DMT communications process, such as shown in FIG. 1, provides excellent transmission data rates over modest communications facilities such as twisted-pair wires. However, multicarrier methods such as IDFT modulation can result in a high peak-to-average ratio (PAR) of the signal amplitudes. The PAR is defined as the ratio of the peak sample power level to the average power level over a sequence of samples. Relatively large peaks in the modulated time-domain signal can occur because the DMT modulated signal is the sum of many independent component signals. In modern DMT modulation, for example as used in DSL communications, the number of summed subchannel signals is sufficient that the well-known central limit theorem applies, and that therefore the amplitude of the IDFT-modulated time domain signal has a Gaussian-like probability distribution function.

FIG. 2 illustrates an example of a typical Gaussian probability distribution function as resulting from modern multichannel DSL communications, in which the amplitudes are distributed around a central mean with a deviation $\sigma$. While the ideal transmitter must be capable of driving all possible amplitudes in this distribution so that no information is lost, some clipping of peak amplitudes is necessitated in practical transmitters. Conventional communications standards are quite stringent, however, specifying amplitude clipping at the transmitter is not to exceed $10^{-7}$, to minimize loss of information. This requirement requires that the maximum amplitude available in the Gaussian probability distribution is about five times the deviation $\sigma$. In practice, therefore, the conventional DMT transmitter must have a line driver power supply voltage ("rail") at voltage $V_s$ (FIG. 1), at $5\sigma$ from the mean. The dynamic range required of conventional DMT transmitters to provide these high amplitudes while maintaining close resolution, particularly in the digital-to-analog conversion function, is very stringent.

As mentioned in Henkel, et al., "Another Application for Trellis Shaping: PAR Reduction for DMT (OFDM)", *Transactions on Communications*, Vol. 48, No. 5 (IEEE, Sep. 2000), pp. 1471-76, similar concerns regarding PAR arise in orthogonal frequency-division multiplexing (OFDM) communications technologies, which are beginning to be used in applications other than DSL communications, including wireless telephony and wireless networks.

The high PAR for conventional DMT signals presents significant constraints on the transmission circuitry, and can greatly complicate the analog circuitry required for high fidelity transmission. For example, a high PAR requires a large dynamic range at the inputs of digital-to-analog and analog-to-digital converters, necessitating a large number of bits of resolution, thus greatly increasing the cost and complexity of these functions. Filters and amplifiers must also become more complex and costly in order to handle both the high peak amplitudes and also the resolution required for the vast majority of the samples having lower amplitude. In addition, the high PAR results in much higher power consumption in the communications circuits, further increasing the cost of the circuits and systems used for DMT transmission and receipt, particularly those circuits often referred to as the analog front end (AFE). Various techniques for reducing the PAR of DMT signals are known in the art, particularly in the DSL context. Examples of these techniques are described in copending application Ser. No. 10/034,951, filed Dec. 27, 2001, published on Nov. 28, 2002 as U.S. Patent Application Publication No. 2002/0176509; and in Gatherer and Polley, "Controlling clipping probability in DMT transmission", *Proceedings of the Asilomar Conference on Signals, Systems, and Computers*, (1997), pp. 578-584, both incorporated herein by this reference.

After a DSL communications link has been established, for example between a central office (CO) and customer premises equipment (CPE), substantial periods of time may elapse in which no information traffic is being carried, but for which the active link is still to be maintained. These idle periods are referred to in the art as "quiescent" periods. Indeed, given the "always on" nature of modern broadband Internet access services, quiescent periods typically dominate active communication time for many users.

To reduce power consumption in DSL transceiver circuitry, particularly on the transmit side, it would be desirable to have a quiescent operating mode in which the average transmit power (e.g., the mean amplitude of, and all other points in, the Gaussian distribution of FIG. 1) is reduced for links that are in their idle, or quiescent, state. However, as known in the art, the initialization and "training" sequence for a new DSL communications link is based upon the signal-to-noise ratios, over frequency, of that new link, as affected by crosstalk interference from other communications links. If a given link is in its quiescent mode during the training of a new link in a neighboring facility, the training of the new link will set its transmit parameters ("bits" and "gains" for each DMT subchannel) based on the assumption that the low crosstalk from the first (idle) link will remain very low. However, once the first link exits its low power quiescent mode and again begins transmitting at full power, the interference on the newly-trained link will not have been comprehended in its training. The bit error rate of the newly-trained link will suffer, as a result.

Accordingly, it has been desirable to reduce the power supply voltage ("rail" voltage $V_s$ of FIG. 1) of DSL transmitters in quiescent mode, thus reducing power dissipation at the transmitter, but without reducing the average power so that the training and initialization of neighboring links will be accurate. A quiescent mode that carries active signals at average power levels, but no information, would be attractive because this signal could be severely clipped to reduce the transmitter power supply rail voltage without loss of information. However, the complete absence of information in quiescent mode is too simplistic an assumption, because some higher layer protocols actually require communication of information during quiescent mode. Frequent entry into and exit from quiescent mode would therefore be necessary in this simple approach.

Various proposals for reducing the PAR in quiescent mode (referred to as "Q" mode, or "L2 mode") were considered in adoption of the ADSL2 standard. Some of these proposals are summarized in Redfern, "A comparison of transparent physical layer Q-mode proposals", submitted to Study Group 15 Question 4, ITU Telecommunications Standardization Sector, Document RN-083 (May 2001), incorporated herein by this reference. As described in that submission, however, these approaches require relatively complex operations at the transmitter, including XOR mapping and sign inversion; two of these approaches also involved phase rotation and post encoding operations that also required changes to the decoder. Because of concerns about the complexity and feasibility of these approaches, none were adopted for the standard.

Rather, conventional standard ADSL2 quiescent mode is achieved by reducing the average power from that used to transmit information-bearing DMT signals. This is accomplished by effectively re-initializing the DSL link, in which the transceivers negotiate a lower data rate in quiescent mode for downstream (CO to CPE) communications. This permits the CO transceiver to use a lower average fine gain level, thus reducing the average transmit power in this mode, and permitting implementation of a lower-power design for the CO transceiver.

However, this standard ADSL Q-mode approach has several drawbacks, as observed in practice. To effect this approach, the CO and CPE must each maintain two "bits and gains" tables for downstream communications—one for normal mode and another for Q mode; if Q mode is to be implemented also for upstream communications, then four such tables are required for each of the CO and CPE. This greatly increases the memory requirements for each transceiver, especially for ADSL2 and higher data rate DSL schemes in which as many as 4096 subchannels are used. In addition, entry into this Q mode requires the CO and CPE to calculate this second set of bits and gains for the large number of subchannels involved, and to exchange these values over the existing overhead channel, both of which consume computational and memory capacity. And since there is a separate bits and gains table for Q mode, and considering the possibility of variations in noise and environment in this mode, either the Q mode itself must support "bit swap" operations, or the transceivers must exit Q mode to effect this bit swap and then re-enter Q mode with the new bits and gains (causing unexpected interference with neighboring links). If the set of subchannels in Q mode is smaller than that in normal transmission, other maintenance operations such as updating frequency domain equalizers (FEQ) and the like cannot be done during Q mode. Framing parameters may also need to be reconfigured for this Q mode approach.

BRIEF SUMMARY OF THE INVENTION

It is therefore an object of this invention to provide a multi-carrier transmitter and method having a low-power quiescent mode in which the output signal amplitude can be substantially reduced at the transmitter.

It is a further object of this invention to provide such an apparatus and method in which exit from the quiescent mode can be easily and efficiently effected.

It is a further object of this invention to provide such an apparatus and method in which information can be faithfully transmitted in the quiescent mode, although at a lower data rate.

It is a further object of this invention to provide such an apparatus and method in which separate subchannel characteristics for quiescent mode need not be maintained by the transceivers involved.

Other objects and advantages of this invention will be apparent to those of ordinary skill in the art having reference to the following specification together with its drawings.

The present invention may be implemented into transceivers for communicating signals modulated onto multiple carriers, or subchannels, and which are capable of operating in a low-power, or quiescent, mode. In the quiescent mode, each frame of multicarrier symbols is transmitted multiple times, with the transmitter operating at a reduced amplitude. In transmission, the repetition may be effected in the frequency domain by modulating the same frame of frequency-domain symbols multiple times, or in the time domain by repeating the modulated time-domain frame multiple times. The number of times that each frame is repeatedly transmitted is preferably selected according to the factor by which the amplitude of the transmitted symbols is reduced, so that the signal-to-noise ratio in this quiescent mode is at least as high as during normal transmission. On receipt, the repeated symbols are summed, with the transmitted symbol coherently combined but with noncoherent noise canceling out.

BRIEF DESCRIPTION OF THE SEVERAL VIEWS OF THE DRAWING

FIG. 6b is a timing diagram illustrating a sequence of transmitted frames exiting quiescent mode according to the method of FIG. 6a.

FIGS. 7b and 7c are timing diagrams illustrating sequences of transmitted frames exiting quiescent mode according to the method of FIG. 7a.

FIG. 8b is a timing diagram illustrating a sequence of transmitted frames exiting quiescent mode according to the method of FIG. 8a.

DETAILED DESCRIPTION OF THE INVENTION

The present invention will be described in connection with its preferred embodiment, namely as implemented into transceivers for digital subscriber line (DSL) communications. However, it is contemplated that this invention may also be used in other communications contexts, especially those using multicarrier modulation (MCM) techniques. A specific example of another such context is orthogonal frequency division multiplexing (OFDM), as is now being deployed in wireless telephone and wireless network communications. It is contemplated that other communications technologies that may benefit from this invention will be apparent to those skilled in the art having reference to this specification. Accordingly, it is to be understood that the following description is provided by way of example only, and is not intended to limit the true scope of this invention as claimed.

Figure 3:
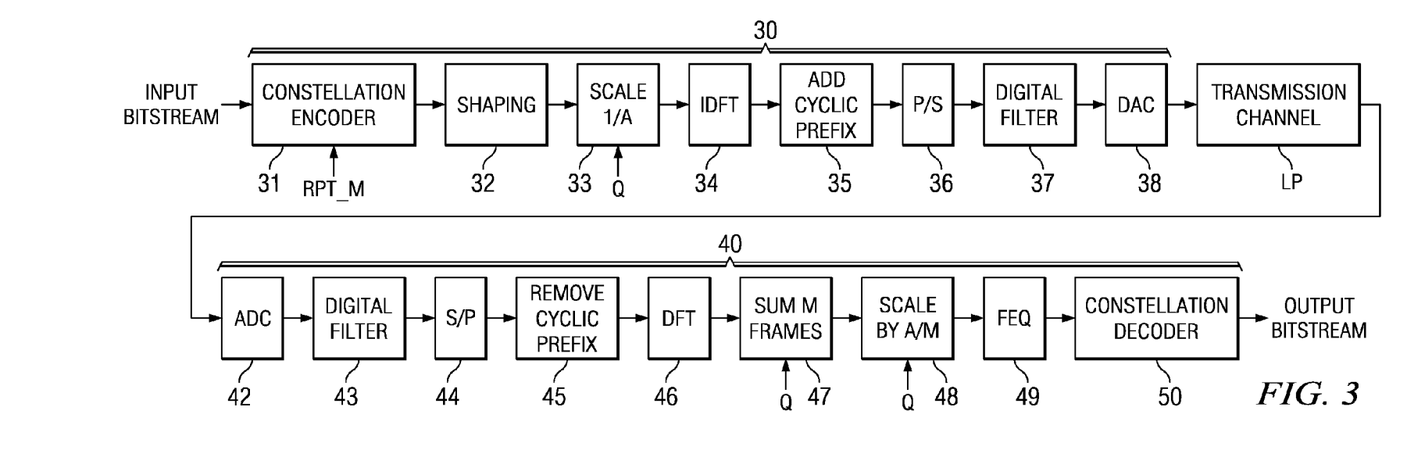
FIG. 3 is a data flow diagram, in block form, illustrating multicarrier communications according to a first preferred embodiment of the invention.

Referring now to FIG. 3, the data flow of DMT communications according to a first preferred embodiment of this invention will now be described in detail. As mentioned above, while this preferred embodiment of the invention is described in connection with a DSL environment, the invention may also be applied to other communications applications, including OFDM wireless communications.

As shown in FIG. 3, transmitting modem 30 is illustrated as modulating an input bitstream, over multiple subchannels, for transmission to receiving modem 40 over transmission channel LP. In this example, the modulation effected by transmitting modem 30 is discrete multitone (DMT) modulation. In a general sense, this modulation is of an input bitstream that is encoded and then arranged into blocks. Each encoded block contains multiple symbols, each symbol constituting one or more bits representing a complex amplitude of one of the subcarriers in the multicarrier signal to be transmitted. Modulation of the encoded block by an inverse Fourier transform produces a time-domain signal that is the sum of the components at each of the subchannel frequencies, each subchannel having the complex amplitude associated with its encoded symbol.

According to the preferred embodiment of the invention, the signals that are transmitted by transmitting modem 30 are, in a quiescent or low power mode, transmitted at a reduced amplitude, but at an average power level that is about the same as the average power level in normal transmission. The need to reduce transmitter power, in quiescent mode, is especially acute at central office (CO) locations of DSL transceivers, considering the large number of loops that are to be supported by each installation of conventional CO DSL transceivers. Accordingly, it is contemplated that, in the DSL context, transmitting modem 30 will typically reside at a central office (CO), such that the quiescent mode transmissions at reduced power, according to this embodiment of the invention, are primarily beneficial for "downstream" communications (CO to CPE). However, it is also contemplated that "upstream" (CPE to CO) quiescent mode communications may also be transmitted and received according to this invention, in which case transmitting modem 30 may correspond to a CPE transceiver.

In addition, as fundamental in this art, communications are typically bidirectional. While transmission in only one direction (transmitting modem 30 to receiving modem 40) is illustrated in FIG. 3, it is of course contemplated that a similar modulation and demodulation data flow, for communications from modem 40 to modem 30, will also typically be executed in DSL communications. These reverse direction communications are typically modulated onto subchannels in a different frequency band from those in the direction shown in FIG. 3, to reduce interference between the oppositely-directed signals. Those skilled in the art having reference to this specification will readily be able to implement such bidirectional communications.

Transmitting modem 30 of FIG. 3 includes constellation encoder 31, which receives the input bitstream from a signal source, which in the downstream DSL context, may be switching fabric coupled to a wide area network such as the Internet. The input bitstream is coupled to constellation encoder 31, which operates in a normal transmission mode to group the bits of the incoming bitstream into frames of multiple-bit symbols. As mentioned above, each symbol is associated with one of the DMT subchannels, with the number of bits in each symbol determined according to the bit loading assigned to its corresponding subchannel, based on the characteristics of the transmission channel that were measured and negotiated during initialization of the current DSL communications session, or as updated during communications, as well-known in the art. Also as known in the art, the amplitudes of the symbols transmitted over various ones of the subchannels are preferably adjusted depending on the channel characteristics, with these subchannel-dependent gains determined during initialization of the communications link and updated during operation. Accordingly, the symbols generated by constellation encoder 11 correspond to points in the appropriate modulation constellation (e.g., QAM), with each symbol associated with one of the DMT subchannels. As before, constellation encoder 11 may also apply additional encoding functions in generating its symbols, example of which include Reed-Solomon or other forward error correction coding, trellis coding, turbo or LDPC coding, and the like.

According to the preferred embodiment of the invention, constellation encoder 31 is controlled to perform its encoding in a different manner during such time as transmitting modem 30 is in a low power quiescent ("Q") mode. As known in the art, in Q mode (or "L2" mode, which is synonymous with Q mode for purposes of this specification) during which the rate at which information is to be transmitted over transmission channel LP is greatly reduced. In some instances, no information whatsoever may be transmitted during Q mode; alternatively, control or other overhead information may be transmitted in Q mode, including updating or maintenance of bit loading and other channel characteristics, etc. Actual payload information may also be transmitted in Q mode, although at a lower data rate. According to this embodiment of the invention, constellation encoder 31 is controlled during Q mode, in response to a control signal RPT_M, to repeat the encoding of each frame of the input sequence multiple times, specifically M times in this example. Each frame of symbols encoded by constellation encoder will be output M times in succession during Q mode, according to this preferred embodiment of the invention.

In this example of transmitting modem 30, shaping function 32 derives and adds a clip prevention signal into the encoded signals to be modulated to reduce the peak-to-average ratio (PAR). An example of the operation of shaping function 32 is described in copending application Ser. No. 10/034,951, filed Dec. 27, 2001, published on Nov. 28, 2002 as U.S. Patent Application Publication No. 2002/0176509, incorporated herein by this reference.

According to this preferred embodiment of the invention during Q mode, scaling function 33 scales the amplitude of each encoded symbol, in the frequency domain and thus prior to modulation in this exemplary implementation. Scaling function 33 is preferably selectably enabled according to the operating mode (e.g., by control signal Q as shown in FIG. 3), so that its scaling is enabled in Q mode, but is bypassed in normal operation so that the amplitude of the encoded symbols is not changed. As will become evident from the following description, because each of the Q mode frames are repeated M times by constellation encoder 31, the power level at which these repeated symbols are transmitted may be reduced to save power consumed in transmission. According to this embodiment of the invention, therefore, scaling function 33 scales down the amplitude of each symbol by a factor A. The factor A by which the amplitude of each symbol is scaled down preferably corresponds to the number of times M (i.e., the repetition factor) that encoder 31 repeats each frame of symbols in Q mode. This relationship between the repetition and scaling factors ensures that the signal-to-noise ratio in Q mode is at least as high as that in normal transmission. The relationship between scaling factor A and repetition factor M will be described in further detail below.

Following scaling function 33, each frame of symbols (with amplitudes scaled in Q mode), is applied to IDFT function 33, for modulation according to an inverse discrete Fourier transform in the conventional manner. In Q mode, as mentioned above, constellation encoder 31 repetitively generates M instances of each encoded frame; IDFT function 33 thus modulates M identical frames in sequence from those M encoded frames. Alternatively, constellation encoder 31 could encode each frame once, in Q mode, with a buffer holding this frame for M consecutive modulation operations by IDFT function 33. Or further in the alternative, a buffer at the output of IDFT function 33 may simply hold the results of the modulation for the frame to be repeated, and logic circuitry provided so that, in Q mode, the contents of this output buffer are presented M times to the downstream circuitry. It is contemplated that those skilled in the art having reference to this specification will be able to select the appropriate manner for generating M consecutive copies of a modulated frame in quiescent mode, using one of these or other techniques.

In any event, a cyclic extension is added to the modulated time-domain frames by function 35, and the modulated and extended time-domain frame is converted into a serial stream (with cyclic extension) by parallel-to-serial converter 36. Digital filter function 37 applies the appropriate digital filtering to the time-domain digital sequence, followed by conversion of the sequence into the analog domain D/A converter 38. The analog signal is then filtered and amplified in the conventional manner, and applied to transmission channel LP for communication to receiving modem 40.

At receiving modem 40, A/D converter 42 converts the incoming analog signal over transmission channel LP (after conventional analog filtering, not shown). Digital filter 43 applies the appropriate digital filters, as in conventional DSL receiver processing (including time-domain equalization to reduce intersymbol interference, as known in the art), and serial-to-parallel converter 44 converts the received digital bitstream into the appropriate blocks. The cyclic extension is removed by function 45, and the resulting block is demodulated by a discrete Fourier transform effected by DFT function 45, as before.

The output of DFT function 46 is a frame of symbols, each symbol associated with one of the subchannel frequencies of the received DMT signal. In normal operation, the demodulated frame is forwarded directly to frequency domain equalizer (FEQ) 49, for removal of the frequency domain characteristics of transmission channel LP, to recover a close estimate of the encoded input signal, in the conventional manner. This estimate is then decoded by constellation decoder 50, to reverse the encoding applied by constellation encoder 11 of transmitting modem 30, thus recovering the normal mode output bitstream, which is forwarded to the destination host equipment, or router or switch for forwarding further downstream.

In Q mode, however, sum function 47 and scaling function 48 are enabled to operate on the demodulated frequency domain symbols output by DFT function 46. According to the preferred embodiment of the invention in Q mode, as described above, each modulated Q mode frame is transmitted M times in succession, with each symbol in each repeated frame being scaled down in amplitude by scaling factor A. On receipt according to the preferred embodiment of the invention, sum function 47 is enabled in Q mode to sum the output of DFT function 46 over M successive received frames. Scaling function 48 scales the amplitude of this sum, in Q mode, by scaling factor A that was applied in transmission (to divide down the transmit amplitude), divided by the repetition factor M to remove the increase in amplitude resulting from the coherent summing of M identical frames. In Q mode, therefore, blocks of data corresponding to the summed and scaled frames as received are forwarded to FEQ 49 and constellation decoder 50 for removal of the channel response and eventual decoding into an output bitstream.

Figure 4:
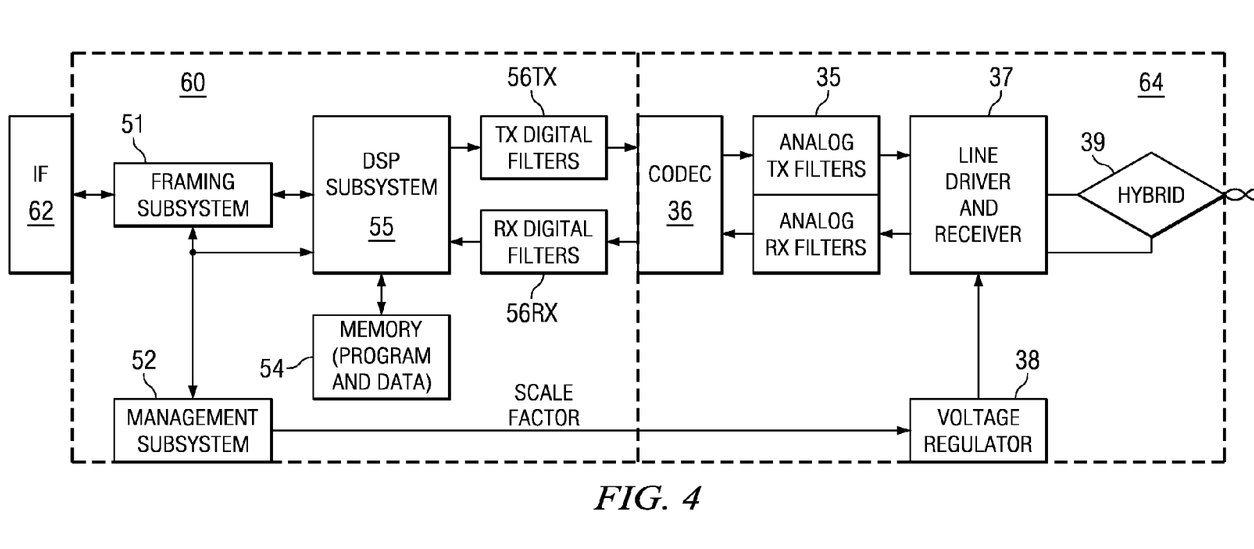
FIG. 4 is an electrical diagram, in block form, illustrating the construction of a transceiver according to the preferred embodiments of the invention.

Referring now to FIG. 4, the construction of an exemplary DSL modem 30 according to a preferred embodiment of the invention will be described. If the reduced power Q mode according to this invention is also implemented for upstream communications, receiving DSL modem 40 may be similarly constructed, but of course configured in a manner corresponding to the different frequencies for upstream and downstream DSL communications. The construction of modem 30 shown in FIG. 4 is provided by way of example only, and is meant only to illustrate a possible modem architecture into which the preferred embodiment of the invention may be implemented. Of course, the invention may be implemented into DSL modems of different architectures, and into communications equipment of similar and different architectures for different communications applications (e.g., router equipment for OFDM wireless communications).

DSL modem 30 is effectively a transceiver, in the sense that it can both transmit and receive signals over communications loop LP. According to this preferred embodiment of the invention, DSL modem 30 includes digital transceiver 60, which is coupled to host interface 62 for communicating with a host computer, network switch fabric, network element such as a router, or the like, depending on the application. Digital transceiver 60 may support one communications port, such as shown in FIG. 4, or alternatively support multiple communications ports. In the example of FIG. 4, digital transceiver 60 is connected to a single instance of analog front end 64, which in turn couples to transmission loop LP, shown as twisted-pair wire in this example.

Analog front end 64 includes hybrid circuit 69, which a conventional circuit that is connected to transmission loop LP, and that converts the two-wire arrangement of the twisted-pair facility to dedicated transmit and receive lines connected to line driver and receiver 67, considering that bidirectional signals are communicated over communications loop LP by DSL modem 30. Line driver and receiver 67 is a high-speed line driver and receiver for driving and receiving ADSL signals over twisted-pair lines. Line driver and receiver 67 is bidirectionally coupled to coder/decoder ("codec") circuit 66 via analog transmit and receive filters 65. Codec 66 in analog front end 64 performs the conventional analog codec operations on the signals being transmitted and received, respectively. Examples of conventional devices suitable for use as analog front end 64 according to the preferred embodiment of the invention include the TNETD7122 and TNETD7123 integrated analog front end devices available from Texas Instruments Incorporated.

As shown in FIG. 4, digital transceiver 60 includes framing subsystem 51, which is coupled to the host side of transceiver 60, and which formats digital data to be transmitted into frames, or blocks, for modulation and transmission. DSP subsystem 55 of digital transceiver 60 is preferably one or more digital signal processor (DSP) cores, having sufficient computational capacity and complexity to perform much of the digital processing in the encoding and modulation (and demodulation and decoding) of the signals communicated via digital transceiver 60. Transceiver 60 also includes memory resources 54, including both program and data memory, accessible by DSP subsystem 55 in carrying out its digital functions, for example according to software stored in memory resources 54. These digital functions includes the IDFT modulation (and DFT demodulation of received signals), appending (and removal) of cyclic extensions, and the like. And according to the preferred embodiments of the invention, the Q mode transmission functions (FIG. 3) of encoding M sequential symbols (constellation encoder 31), scaling the symbol amplitude (scaling function 33), as well as the Q mode decoding functions of summing M successive demodulated symbols (sum function 47) and scaling the summed result (scaling function 48) are preferably also implemented by software routines executed by DSP subsystem 55.

As shown in FIG. 4, digital transceiver 60 also includes transmit and receive digital filters 56TX, 56RX, respectively, for applying the appropriate filter functions to the transmitted and received signals, respectively. Digital filters 56TX, 56RX may be executed by DSP subsystem 40 according to the corresponding software routines, as known in the art, or alternatively may be realized as separate hardware resources as suggested by FIG. 4. Management subsystem 52 implements and effects various control functions within digital transceiver 60, communicating with each of the major functions of digital transceiver 30 to control its operation according to the desired number of ports to be supported.

According to this exemplary implementation, management subsystem 52 also controls the application of the desired power supply "rail" voltages to line driver and receiver 37 in analog front end 34. Specifically, management subsystem 52 communicates with voltage regulator 38 in analog front end 34, which applies the desired rail voltage to line driver and receiver 37. In normal transmission, management subsystem 52 deasserts a scale signal, in which case the regulated rail voltage applied by voltage regulator 38 to line driver and receiver 37 (specifically to the line driver portion) is the full power supply voltage for normal transmission, ensuring that the bit error loss due to clipping is below the desired level (e.g., $10^{-7}$), considering the peak-to-average ratio (PAR) for the multicarrier signal. In Q mode, management subsystem 52 asserts a scale factor signal to voltage regulator 38, in response to which voltage regulator 38 forwards a reduced rail voltage to the line driver in line driver and receiver 37. This reduced rail voltage, corresponds to the scaling down in amplitude of the transmitted symbols, by scaling factor A. As a result, the power consumption of analog front-end 34, and thus of DSL modem 30, is greatly reduced in this quiescent mode.

As mentioned above, the architecture shown in FIG. 4 is presented by way of example only. Alternative architectures for DSL modem communication, and for other multicarrier modulation communication systems such as OFDM wireless communications, are also contemplated to be within the scope of the invention, and may be implemented by those skilled in the art having reference to this specification, without undue experimentation.

Figure 5:
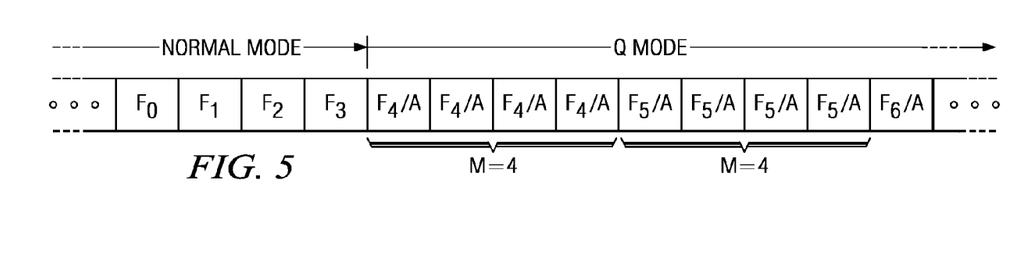
FIG. 5 is a timing diagram illustrating a sequence of transmitted frames in normal and quiescent modes, according to the preferred embodiments of the invention.

In operation during Q mode, as described above, a sequence of repeated symbols (repeated a number of times corresponding to repetition factor M), each with an amplitude scaled down by scaling factor A, are transmitted by transmitting modem 30. FIG. 5 illustrates an exemplary sequence of frames as transmitted by transmitting modem 30. In the sequence shown in FIG. 5, frames $F_0$ through $F_3$ are transmitted in normal mode, each frame appearing once, at full amplitude. Following frame $F_3$ in this sequence, transmitting modem 30 begins transmitting frames in Q mode, in which constellation encoder 31 is controlled to encode M frames in sequence, and in which scaling factor 33 is enabled to scale down the amplitude of each symbol in each repeated frame by scaling factor A. In this example, repetition factor M is four, such that each successive Q mode frame is transmitted four times in sequence, with four instances of frame $F_4$, followed by four instances of frame $F_5$, and so on. Each of the Q mode frames ($F_4$ et seq. in this example) has its amplitudes scaled down by scaling factor A, as shown in FIG. 5.

On receipt, as described above, normal mode frames $F_0$ through $F_3$ are received in sequence, and are demodulated and decoded in the conventional manner; in this mode, sum function 47 and scaling function 48 are each disabled, or bypassed. At this point, the entry into Q mode is communicated by transmitting modem 30 to receiving modem 40, for example in an overhead channel (for the example of conventional DSL communications). For example, the entry into Q mode may be negotiated between transmitting modem 30 and receiving modem 40 similarly as a "bit swap" operation, as described in U.S. Pat. No. 5,400,322, issued Mar. 21, 1995, and incorporated herein by this reference. In general, transmitting modem 30 and receiving modem 40 can negotiate entry into Q mode by transmitting and acknowledging, respectively, the values of scale factor A, repetition factor M, and a specific frame at which Q mode is to be entered. In the example of FIG. 5, sum function 47 and scaling function 48 are enabled at receiving modem 40 at the agreed frame (i.e., the first instance of frame $F_4$/A), and the receipt of the repeated and scaled frames is then processed as described above.

According to the preferred embodiments of the invention, as mentioned above, scaling factor A is preferably selected in a manner corresponding to repetition factor M. The correspondence of these factors is preferred so that the signal-to-noise ratio during Q mode is not unduly degraded in this mode; indeed, according to the preferred embodiment of the invention, the factors M, A can be selected to actually improve the signal-to-noise ratio in Q mode, by taking advantage of the reduced data rate while still reducing the power dissipation at transmitting modem 30. This correspondence will now be described in detail.

In normal DSL transmission mode (i.e., "showtime"), one can consider the received time-domain signal $Y_t^{normal}$:

$$Y_t^{normal}(k) = S_t(k) + V_t(k)$$

for subchannel k, where $S_t(k)$ is the transmitted time-domain signal for subchannel k, and in which additive white Gaussian noise is expressed as $V_t(k)$. One can then derive the signal to noise ratio $SNR^{normal}$ for normal DSL transmission mode as:

$$SNR^{normal}(k) = \frac{E\left[\frac{S_t(k)S_t^*(k)}{V_t(k)V_t^*(k)}\right]}{E} = \frac{\sigma_s^2(k)}{\sigma_v^2(k)}$$

using the conventional nomenclature $\sigma_s^2$, $\sigma_v^2$ for the signal and noise power levels, respectively.

According to the preferred embodiment of the invention, during Q mode, the amplitude of the received time domain signal $Y_t^Q$ is scaled down, from that of the symbol amplitude $S_t$, by scaling factor A:

$$Y_t^Q(k) = \frac{1}{A} S_t(k) + V_t(k)$$

Recalling that each symbol is repeated M times in Q mode according to the preferred embodiment of the invention, one can express a Q mode symbol amplitude as:

$$S_{tM}(k) = S_{tM+1}(k) = \ldots = S_{tM+(M-1)}(k)$$

indicating that, each symbol is repeated M times. The received Q mode signal $Y_{tM}^Q(k)$ for a given symbol thus amounts to the sum:

$$Y_{tM}^Q = \sum_{m=0}^{M-1} Y_{tM+m}^Q(k)$$

$$= \sum_{m=0}^{M-1} \left(\frac{1}{A} S_{tM+m}(k) + V_{tM+m}(k)\right)$$

$$= \frac{M}{A} S_{tM}(k) + \sum_{m=0}^{M-1} (V_{tM+m}(k))$$

Given this expression for the received Q mode signal, the SNR in Q mode can be derived, as summed over the M repeated frames:

$$SNR^Q(k) = \frac{E\left[\frac{M}{A}S_{tM}(k)\frac{M}{A}S_{tm}^*(k)\right]}{E\left[\left(\sum_{m_1=0}^{M-1} V_{tM+m_1}(k)\right)\left(\sum_{m_2=0}^{M-1} V_{tM+m_2}(k)\right)\right]}$$

$$= \frac{\frac{M^2}{A^2}\sigma_s^2(k)}{E\left[\sum_{m=0}^{M-1} V_{tM+m}(k)V_{tM+m}^*(k)\right]}$$

$$= \frac{\frac{M^2}{A^2}\sigma_s^2(k)}{M\sigma_v^2(k)}$$

$$= \frac{M}{A^2}SNR^{normal}(k)$$

Accordingly, in order to maintain the same signal-to-noise ratio, in Q mode, as is present in normal operation, the repetition factor M must be greater than or equal to the square of the desired scaling factor A. Especially in those situations in which information (albeit at a lower data rate) is communicated in Q mode, it is preferred that the signal-to-noise ratio not be degraded in Q mode; according to the preferred embodiment of the invention, therefore, repetition factor M is greater than or equal to the square of the desired scaling factor A. Typically, because the scaling factor A corresponds to the desired reduction in transmitter power in Q mode, repetition factor $M \geq A^2$ is then selected to ensure equivalent or better SNR. Indeed, the SNR during Q mode can be enhanced, relative to that in normal operation, by choosing a repetition factor M that is somewhat larger than squared scaling factor $A^2$. Of course, the Q mode effective data rate is reduced as the repetition factor M increases.

Various alternative mechanisms for exiting Q mode, and returning to normal mode, according to the preferred embodiments of the invention will now be described in detail. According to a simple approach, exiting from Q mode may be effected in much the same manner as the entry into Q mode is negotiated. In this approach, Q mode exit is negotiated by transmitting modem 30 and receiving modem 40 similarly as a "bit swap" operation, in which transmitting modem 30 and receiving modem 40 communicate and acknowledge a specific frame at which Q mode is to be exited. The communication and acknowledgement for exiting Q mode may be carried by way of an overhead channel that is communicated over the repeated and scaled symbols in Q mode (e.g., as shown in FIG. 4).

Figure 6A:
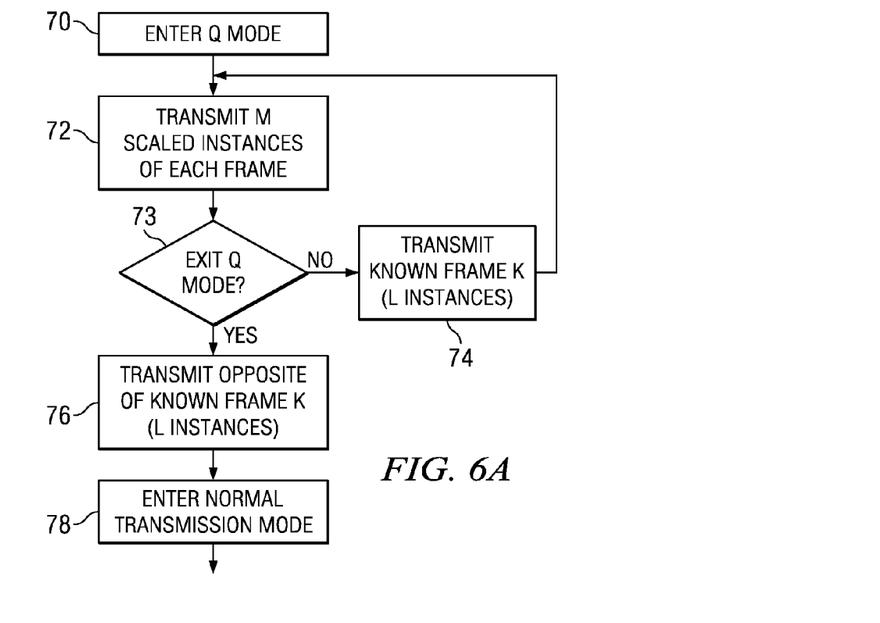
FIG. 6a is a flow diagram illustrating a method of exiting quiescent mode according to one preferred embodiment of the invention.
Figure 6B:
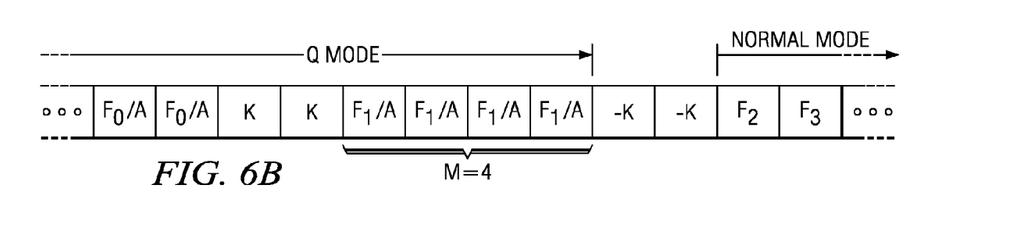

Especially if the entry into and exit from Q mode occurs somewhat frequently, however, it is desirable to implement a "fast" exit method. FIGS. 6a and 6b illustrate the operation of a fast Q mode exit method according to one preferred embodiment of this invention. In the flow diagram of FIG. 6a, the operations are executed at transmitting modem 30; receiving modem 40 has the capability of responding to the transmitted information, as will be evident from the following description. Q mode is entered in process 70, for example according to the negotiation approach over a DSL overhead channel, as mentioned above. While in Q mode, transmission process 72 is executed as described above, with each frame modulated and transmitted M times, each instance with its amplitude scaled down by scaling factor A to save power at the transmitter. In the sequence of FIG. 6b, this transmission is illustrated, by way of example, as scaled frames $F_0/A$.

After M repeated frames are complete, decision 73 is performed by transmitting modem 30, to determine whether Q mode is to be exited. If not (decision 73 is NO), a frame K containing specific known symbol values (i.e., known or "recognizable" by the receiving modem 40) is transmitted for a known number (L) of instances. In this example, frame K is transmitted twice in succession, as shown in FIG. 6b. While repeating the known frame K reduces the overall data rate of the Q mode transmission, this repetition ensures that Q mode is not inadvertently exited by the receipt of a random symbol that happens to match known symbol K; alternatively, frame K may be reserved only for this purpose, in which case a single instance may suffice. Receiving modem 40 recognizes the repeated known frame K, and in response continues to enable its sum function 47 and scaling function 48 (FIG. 3) for the next group of M frames. These next symbols (scaled frames $F_1/A$ in FIG. 6b) are then transmitted by transmitting modem 30 in process 72.

Transmitting modem 30 exits Q mode after a full sequence of M repeated frames are transmitted, with the result of decision 73 being YES. In this event, transmitting modem 30 signals the imminent exiting from Q mode by transmitting the opposite, or complement, of known frame K for a preselected number of instances, in process 76. In this example, as shown in FIG. 6b, opposite known frame—K is transmitted twice. Receiving modem 40 is configured to recognize these opposite symbol values in this frame, and will then disable sum function 47 and scaling function 48 for the received frames following the L instances of opposite known frame—K. Normal transmission process 78 is then executed by transmitting modem 30, as shown by frames $F_2$, $F_3$, etc. of FIG. 6b.

According to this embodiment of the invention, a fast exit from Q mode is effected. The maximum potential delay from the specific event causing the exit is limited to L+M−1 frames according to this embodiment of the invention. However, this approach results in a Q mode data rate that is 1/(L+M) times that of the normal transmission data rate, considering that each frame is repeated M times, with L instances of the known frame K inserted between each actual symbol.

Figure 7A:
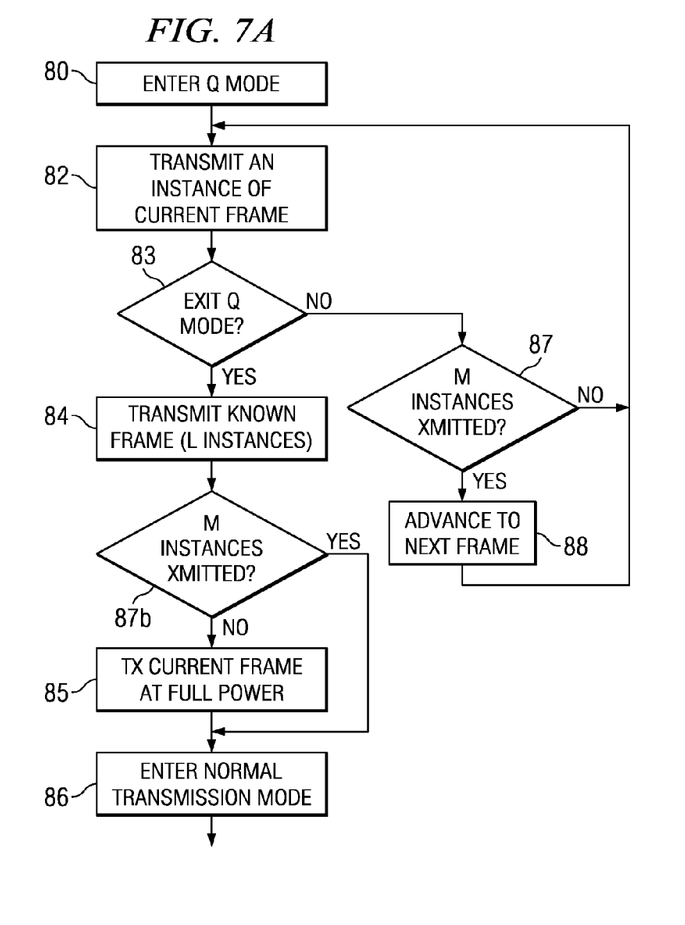
FIG. 7a is a flow diagram illustrating a method of exiting quiescent mode according to another preferred embodiment of the invention.
Figure 7B:
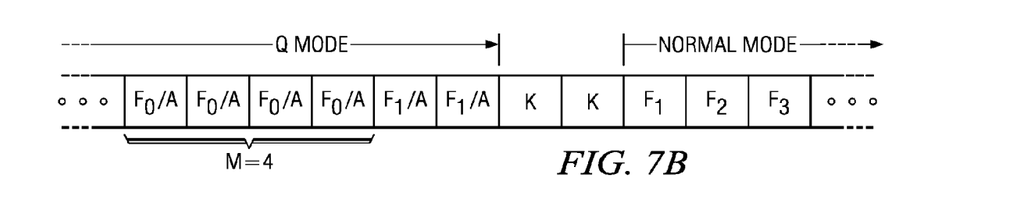

FIGS. 7a and 7b illustrate a fast exit mode according to another preferred embodiment of the invention. In this approach, Q mode is entered in process 80 in the manner described above; in Q mode, each instance of the current frame is modulated and transmitted at amplitudes scaled down by scaling factor A, in transmission process 82. Transmitting modem 30 then executes decision 83, to determine whether Q mode is to be exited, after each transmission of a scaled frame. If Q mode is not to be exited, (decision 83 is NO), and if the M repeated frames are not complete for the current symbol (decision 87 is NO), transmission process 82 is immediately repeated for the next instance of the current frame, again with scaled amplitudes, but without a known frame K transmitted between symbols. Upon the M repeated instances for a current frame being transmitted by transmitting modem 30 (decision 87 is YES), transmitting modem 30 advances to the next Q mode frame to be transmitted in process 88, and transmission process 82 is then executed for the first instance of this next frame.

In the example shown in FIG. 7b, Q mode transmission is performed for a full M=4 frames $F_0/A$, and for a first two instances of frame $F_1/A$. During Q mode operation, as before, receiving modem 40 interprets all frames as repeated and scaled, and continues to enable its sum function 47 and scaling function 48 for all received frames.

Transmitting modem 30 can exit Q mode immediately, after the transmission of any instance of one of the M repeated frames are transmitted, upon decision 83 being YES. Transmitting modem 30 then signals this exit to receiving modem 40 in process 84, by transmitting known frame K for a preselected number (L) of instances. In this example, as shown in FIG. 7b, known frame K is transmitted twice (L=2) after the last scaled frame $F_1/A$. Receiving modem 40 is recognizes the repeated frame K, and disables its sum function 47 and scaling function 48 for the received frames in response.

But if the M instances of the current frame have not been transmitted upon this exit from Q mode, receiving modem 40 will not be able to fully recover the current frame, because not enough instances have been received for the sum by sum function 47 to be valid. This probability is handled by transmitting modem 30 executing decision 87b to determine whether all M instances of the current frame were transmitted. If not (decision 87b is NO), transmitting modem 30 transmits one instance of the current frame (for which at least one scaled instance was transmitted before known frame K), at full (unscaled) power, in process 85. Receiving modem 40 can thus receive and process this full power frame, with sum function 47 and scaling function 48 disabled, to fully and accurately recover the information in this frame. This event is illustrated in FIG. 7b, with the full power instance of frame $F_1$ in the sequence following the two instances of known frame K. Normal transmission process 86 is then executed by transmitting modem 30, as shown by frames $F_2$, $F_3$, etc. of FIG. 7b.

Figure 7C:
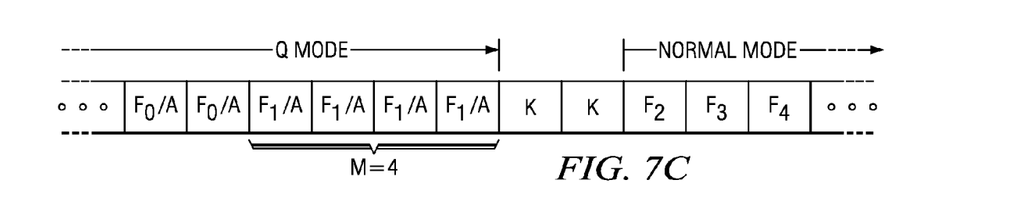

If all M instances of the previous frame were in fact transmitted in Q mode (decision 87b is YES), then receiving modem 40 is able to fully recover the transmitted information, via the operation of sum function 47 and scaling function 48. This most recent frame need not be transmitted, and normal transmission process 86 can then immediately commence. An example of this fast exit is illustrated in FIG. 7c, in which known frame K is transmitted L=2 times following the transmission of a full set of M repetitions of scaled frame $F_1/A$. Following the two instances of known frame K, then single instances of unscaled frames $F_2$, $F_3$, etc. are transmitted by transmitting modem 30, and are received and processed by receiving modem 40.

The fast exit from Q mode according to this embodiment of the invention, has a maximum potential delay, from the event causing exit, that is limited to L+1 frames. And this approach results in a Q mode data rate that is 1/M times that of the normal transmission data rate, considering that each frame is repeated M times, and that the known frame K is not inserted between each symbol, as in the case of FIG. 7a. Accordingly, the Q mode performance of this embodiment of the invention is improved both in exit latency and data rate, from that of FIGS. 6a and 6b, although some increase in computational complexity may be required to decide whether to exit Q mode at each frame, and to more rapidly process the exit operation at receiving modem 40.

Figure 8A:
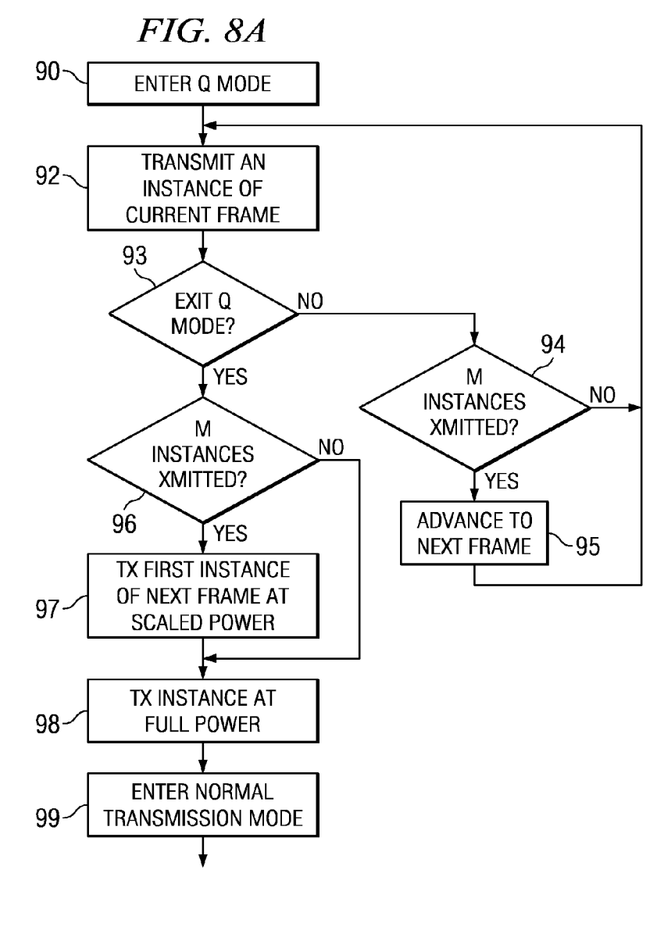
FIG. 8a is a flow diagram illustrating a method of exiting quiescent mode according to another preferred embodiment of the invention.
Figure 8B:
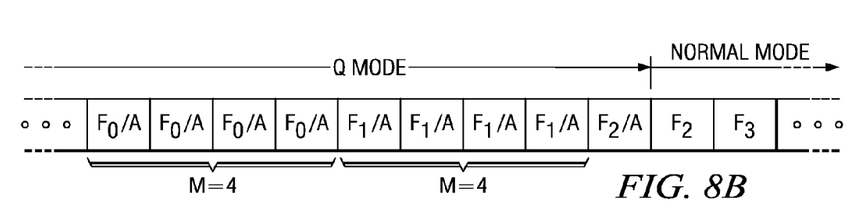

FIGS. 8a and 8b illustrate a fast exit mode according to still another preferred embodiment of the invention. In this approach, transmitting modem 30 enters Q mode in process 90 (as does receiving modem 40), in which M repeated frames are modulated and transmitted in transmission process 92, each at an amplitude that is scaled down by scaling factor A. Receiving modem 40, by way of sum function 47 and scaling function 48 (FIG. 3), recovers the information from these repeated scaled frames, in the manner described above. According to this fast exit approach, transmitting modem 30 executes decision 93 to determine whether Q mode is to be exited, after each instance of a transmitted scaled frame. If Q mode is not to be exited, (decision 93 is NO), transmitting modem 30 executes decision 94 to determine whether a full set of M instances of the current frame have been submitted. If not (decision 94 is NO), transmitting process 92 is repeated for another instance of the current frame; if so (decision 94 is YES), transmitting modem 30 advances to the next Q mode frame to be transmitted in process 95, and transmitting process 92 is then executed for the first instance of that next frame, in process 92.

According to this embodiment of the invention, when Q mode is to be exited after the transmission of an instance of a scaled frame (decision 93 is YES), transmitting modem 30 determines whether all M instances of the last frame were transmitted, in decision 96. If not (decision 96 is NO), then the Q mode exit is occurring after at least one instance, but not all M instances, of the last frame were transmitted. The exit from Q mode is then indicated, to receiving modem 40, by transmitting the next instance of the current frame at its full (unscaled) amplitude, in process 98. Normal transmission mode is then entered in process 99.

The exit of Q mode is effected by transmitting modem 30 disabling or bypassing scaling function 33 (FIG. 3) beginning with the repeated instance of that frame (process 96). According to this embodiment of the invention, receiving modem 40 monitors the power of each received frame, and specifically monitors changes in the power level for repeated instances of the same frame in Q mode. Exit from Q mode is detected by receiving modem 40 noticing a power increase, by scaling factor A, from one instance of a frame to the next. According to this embodiment of the invention, the transmission and receipt of at least one instance of a frame at scaled power, in Q mode, provides a reference level against which receiving modem 40 can then detect the full power level of that same frame to detect the exit from Q mode. In response to detecting the full power level of a repeated frame, sum function 47 and scaling function 48 (FIG. 3) are disabled in receiving modem 40, and the information in that frame is recovered from the full, unscaled, amplitude.

FIG. 8b illustrates an example of the operation of the Q mode exit process of FIG. 8a, for the case in which Q mode is exited immediately, within a set of M instances of a frame. In this example, Q mode transmission was performed for a full M=4 frame $F_0/A$ and frames $F_1/A$, and for one instance of scaled frame $F_2/A$. Q mode is exited following this first instance of scaled frame $F_2/A$, as indicated by that same frame $F_2$ then being transmitted, followed by unscaled, normal amplitude and normal transmission mode, frames $F_3$, etc.

Referring back to FIG. 8a, there is a possibility (indeed, a 1/M probability) that Q mode will be exited following the transmission of a full set of M repeated instances of a frame, and prior to one instance of the next frame transmitted at its scaled (1/A) amplitude. In this case (decision 96 is YES), transmitting modem 30 transmits one instance of the next frame at its scaled (1/A) amplitude, in process 97. This scaled amplitude provides a reference level to receiving modem 40, against which it can detect substantial changes in power in a succeeding frame and thus detect exit from Q mode. Transmitting modem 30 then transmits an unscaled instance of that frame, in process 98, followed by entry into normal transmission mode in process 99.

According to the Q mode exit approach of FIGS. 8a and 8b, the latency, or delay, on exiting Q mode is one frame, which is either the transmission of a scaled first instance of the next frame (process 97) or the transmission of the unscaled instance of the current frame (process 98). The Q mode data rate is also maximized to 1/M times that of the normal transmission data rate, considering that each frame is repeated M times and that no indicator symbols are required.

According to the above description, the operations of repeating (for transmission), summing (on receipt), and scaling (both for transmission and on receipt) are performed in the frequency domain. Specifically, in transmitting modem 30 of FIG. 3, the repeated encoding function 31 and scaling function 33 are performed prior to IDFT modulation function 34; in receiving modem 40, sum function 47 and scaling function 48 are performed after DFT demodulation function 46. Alternatively, as will be described relative to FIG. 9, these functions may be performed on the signals in the time domain.

Figure 9:
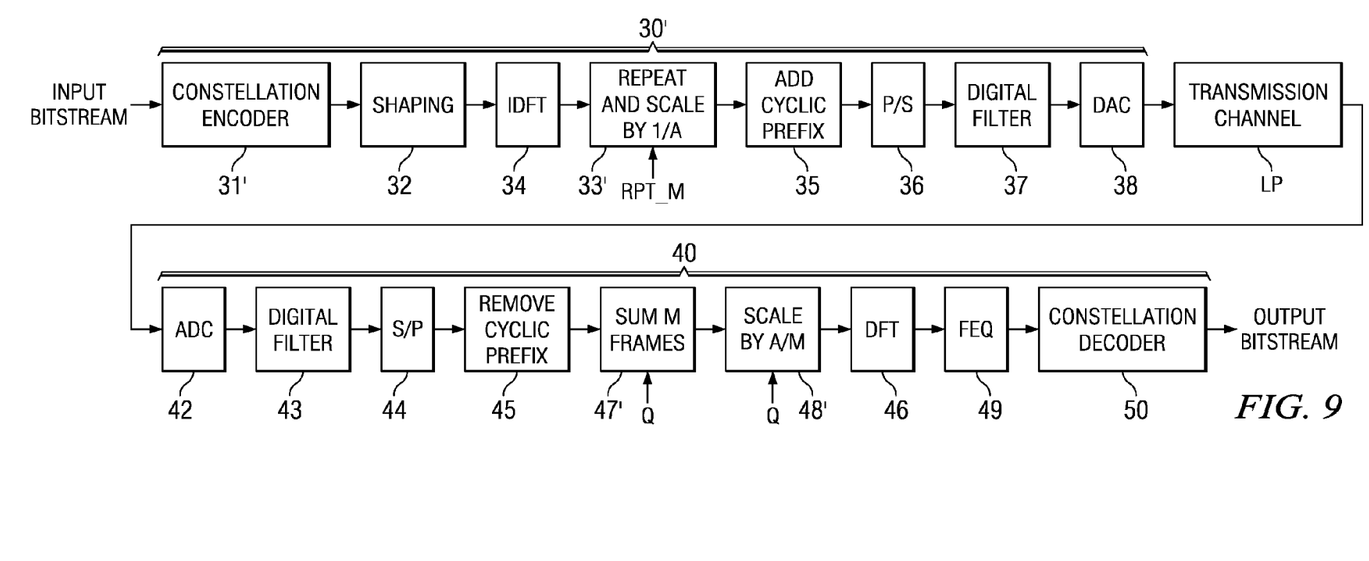
FIG. 9 is a data flow diagram, in block form, illustrating multicarrier communications according to a second preferred embodiment of the invention.

FIG. 9 illustrates the data flow of DMT signals, for example in a DSL environment, according to a second preferred embodiment of the invention in which power may be reduced at the transmitter without loss of signal-to-noise ratio. The same elements of FIG. 9 as present in FIG. 3 are referred to by the same reference numerals.

In transmitting modem 30' of FIG. 9, according to this alternative embodiment of the invention, constellation encoder 31' again receives the input bitstream, groups the bits of this bitstream into frames of multiple-bit symbols e.g., QAM) corresponding to the DMT subchannels, and according to the current bit loading. Constellation encoder 31' may also apply additional encoding functions in generating its symbols, example of which include Reed-Solomon or other forward error correction coding, trellis coding, turbo or LDPC coding, and the like. In contrast to the first preferred embodiment of the invention, however, encoder 31' encodes only a single instance of each multicarrier frame, both in normal communication mode and also in Q mode. The encoded output of encoder 31' is applied to shaping function 32, which derives and adds a clip prevention signal to reduce the peak-to-average ratio (PAR), as described above and in U.S. Patent Application Publication No. 2002/0176509, incorporated herein by this reference. The output of shaping function 32 is applied to IDFT modulation function 34, for modulation according to an inverse discrete Fourier transform, in the conventional manner.

As described above, the data rate requirements, over transmission channel LP, are greatly reduced for Q mode. According to this embodiment of the invention, repeat and scale function 33' is provided after IDFT modulation function 34, to repeat each time-domain frame a number of times corresponding to repetition factor M, and to scale down the amplitude of each symbol by scaling factor A, similarly as described above. By reducing the amplitude of the transmitted signal, the power supply voltages applied to the transmitter of transmitting modem 30' may be reduced, and this reduction in amplitude is compensated by the repeated transmission of the same symbol. As a result, the power consumption of transmitting modem 30' can be reduced in Q mode, without loss of data. According to this embodiment of the invention, repeat and scaling function 33' is controlled during Q mode, in response to a control signal RPT_M, to repeat each frame of the input sequence multiple times, specifically M times in this example, and to scale down the amplitude of each symbol in these repeated frames by scaling factor A. In Q mode according to this preferred embodiment of the invention, therefore, each frame of symbols encoded by constellation encoder will be output M times in succession, each at a reduced amplitude so that transmitter power can be reduced.

As before, the repetition factor M is preferably derived with reference to scaling factor A by which the amplitude of each symbol is scaled down. As described above, repetition factor M is preferably selected so that the signal-to-noise ratio in Q mode is at least as good as in normal communication mode, while still obtaining the reduced power consumption because of the downscaling of symbol amplitude by scaling factor A.

Following scaling function 33', the same transmit functions are performed by transmitting modem 30' (in both normal and Q modes) as described above. Specifically, a cyclic extension is added to each time-domain frame by function 35, before conversion into a serial stream (with cyclic extension) by parallel-to-serial converter 36. Digital filter function 37 applies digital filtering, and D/A converter 38 converts the filtered time-domain digital sequence into a corresponding analog signal, which is then filtered and amplified in the conventional manner, and applied to transmission channel LP.

A/D converter 42 in receiving modem 40' converts the incoming analog signal, after analog filtering (not shown), into the digital domain for digital filtering by digital filter 43, and perhaps time-domain equalization (not shown). Serial-to-parallel converter 44 converts the filtered digital bitstream into parallel digital data, from which the cyclic extension is removed by function 45. According to this embodiment of the invention, however, in which repeating and scaling functions are performed in the time domain, sum function 47 and scaling function 48 are enabled in Q mode (and bypassed, or disabled, in normal mode). Specifically, after removal of the cyclic extension by function 45, in Q mode sum function 47 sums the time-domain digital signal over M successive frames, and scaling function 48 scales the amplitude of this sum by scaling factor A that was applied in transmission (to divide down the transmit amplitude), divided by the repetition factor M to remove the increase in amplitude resulting from the coherent summing of M identical frames.

The resulting summed and scaled time-domain frame is then applied to and demodulated by DFT demodulation function 45, as before. The demodulated symbols, at each of the subcarrier frequencies, are then forwarded to frequency domain equalizer (FEQ) 49 for removal of the frequency domain characteristics of transmission channel LP, followed by decoding by constellation decoder 50 to reverse the encoding applied by constellation encoder 31 of transmitting modem 30', and recover the transmitted data.

According to this alternative embodiment of the invention, therefore, the quiescent mode summing and scaling is performed in the time domain, rather than the frequency domain. Entry into and exiting from Q mode according to the time-domain approach of FIG. 9 can be effected similarly as described above relative to FIG. 3. It is contemplated that those skilled in the art having reference to this specification will be readily able to select the domain, and implement the appropriate scaling and repeating operations in the selected domain, as best appropriate for particular applications. In either case, however, the repeating, summing, and scaling operations are preferably performed in the digital domain, and as such can be easily and efficiently executed by digital signal processing circuitry (e.g., DSP subsystem 55 of FIG. 4), or by other digital logic within the transceiver.

This invention provides important advantages in multicarrier modulated communications. As evident from this description, a quiescent, or low-power, mode is provided in which information may be transmitted at a lower data rate, and with a transmitter operating at reduced consumed power, but without degrading (and possibly improving) the signal-to-noise ratio in this mode. These operational benefits are attained without requiring additional "bits and gains" tables, and thus with memory efficient construction; in addition, Q mode entry does not require computationally complex operations of deriving new bit loadings and gains, etc. Indeed, the scaling factor A and the repetition factor M can be derived by simple shifts, if the values are constrained to powers of two. And once in Q mode, bit swaps and other maintenance of the channel can continue, without exiting Q mode. Entry into the Q mode is efficiently effected by the exchange of only a few factors, and very rapid exit from this mode can be made according to various alternatives. Framing and higher layer parameters are the same in Q mode as in normal communications, and need only be used on only one of every M Q mode frames, enabling additional power savings and even simpler framing approaches.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A multicarrier communications method, comprising:
   encoding an input bitstream into a frame comprised of a plurality of symbols, each symbol associated with one of a plurality of subchannels and corresponding to an amplitude for its associated subchannel;
   modulating the encoded frame into a multicarrier time-domain frame, each carrier associated with one of the plurality of subchannels;
   in a normal operating mode, transmitting each encoded frame at normal mode amplitudes corresponding to the encoded symbols; and
   in a quiescent mode, transmitting a selected number of instances of each encoded frame in sequence, each instance at amplitudes scaled down by a scaling factor relative to the normal mode amplitudes for that frame.

2. The method of claim 1, further comprising:
   in the quiescent mode, generating a sequence of modulated encoded frames, for the selected number of instances, for each encoded frame; and
   in the quiescent mode, before the modulating step, scaling down the amplitudes of the symbols of each encoded frame by the scaling factor;
   wherein the transmitting step, in the quiescent mode, comprises transmitting each modulated frame from the modulating step.

3. The method of claim 2, wherein the generating step comprises:
   repeating the modulating step for the selected number of instances for each encoded frame.

4. The method of claim 1, further comprising:
   in the quiescent mode, after the modulating step, generating the selected number of instances of the multicarrier time-domain frames corresponding to one instance of the modulating step; and
   in the quiescent mode, after the modulating step, scaling down the amplitudes of the symbols of each multicarrier time-domain frame by the scaling factor.

5. The method of claim 1, wherein the selected number of instances is greater than or equal to the square of the scaling factor.

6. The method of claim 1, further comprising:
   in the quiescent mode, after transmitting the selected number of instances for a first encoded frame, remaining in the quiescent mode by:
     then transmitting at least one instance of a recognizable frame; and
     then transmitting the selected number of instances for a second encoded frame; and
   in the quiescent mode, after transmitting the selected number of instances for a first encoded frame, exiting the quiescent mode by:
     then transmitting at least one instance of an opposite of the recognizable frame.

7. The method of claim 1, further comprising:
   in the quiescent mode, after transmitting one or more instances, but fewer than the selected number of instances, of a first encoded frame in sequence, exiting the quiescent mode by:
     then transmitting at least one instance of a recognizable frame; and
     then transmitting the first encoded frame at normal mode amplitudes.

8. The method of claim 7, further comprising:
   in the quiescent mode, after transmitting the selected number of instances of the first encoded frame in sequence, exiting the quiescent mode by:
     then transmitting at least one instance of the recognizable frame.

9. The method of claim 1, further comprising:
   receiving a sequence of frames corresponding to the transmitted selected number of instances of each encoded frame in sequence in the quiescent mode;
   summing the selected sequence of frames corresponding to the transmitted selected number of instances into a summed frame;
   scaling the amplitudes of the summed frame by the scaling factor divided by the selected number of frames.

10. The method of claim 9, further comprising:
    demodulating each of the received sequence of frames, prior to the summing and scaling steps.

11. The method of claim 9, further comprising:
    after the step of scaling the amplitudes of the summed frame, then demodulating the summed frame with scaled amplitudes.

12. The method of claim 1, further comprising:
    during the transmitting step in the normal operating mode, transmitting a scale factor, a repetition factor, and a frame identifier in an overhead channel;
    wherein the transmitting step in the quiescent mode is performed beginning with a frame corresponding to the frame identifier, responsive to receiving an acknowledgement of the transmitted scale factor, repetition factor, and frame identifier.

13. A multicarrier communications method, comprising:
    receiving multicarrier signals from a communications facility, the multicarrier signals including component signals at a plurality of subchannels, corresponding to a sequence of frames;
    in a quiescent mode, summing a selected number of frames in sequence to form a summed frame;
    in the quiescent mode, scaling amplitudes of the summed frame by a scaling factor divided by the selected number of frames;
    demodulating received frames into a plurality of symbols of each frame; and
    recovering a data stream from the demodulated frames.

14. The method of claim 13, further comprising:
    in a normal operating mode, performing the receiving, demodulating, and recovering steps without performing the summing and scaling steps.

15. The method of claim 13, wherein the summing and scaling steps are performed after the demodulating step.

16. The method of claim 13, wherein the summing and scaling steps are performed before the demodulating step.

17. A transmitter apparatus for multicarrier communications, comprising:

analog front end circuitry, comprising driver circuitry, for coupling to a communications facility;

an interface for coupling to a host system; and a digital transceiver, coupled to the analog front end circuitry and the interface, for processing digital data to be transmitted over the communications facility, according to a sequence of operations comprising:

encoding an input bitstream received from the interface into a frame comprised of a plurality of symbols, each symbol associated with one of a plurality of subchannels and corresponding to an amplitude for its associated subchannel;

modulating the encoded frame into a multicarrier time-domain frame, each carrier associated with one of the plurality of subchannels;

in a normal operating mode, forwarding each encoded frame at normal mode amplitudes corresponding to the encoded symbols, for transmitting over the communications facility; and in a quiescent mode, forwarding a selected number of instances of each encoded frame in sequence for transmitting over the communications facility, each instance at amplitudes scaled down by a scaling factor relative to the normal mode amplitudes for that frame.

18. The transmitting apparatus of claim 17, further comprising:

circuitry for reducing a power supply rail voltage to the driver circuitry in the quiescent mode.

19. The transmitting apparatus of claim 17, wherein the sequence of operations further comprises:

in the quiescent mode, generating a sequence of modulated encoded frames, for the selected number of instances, for each encoded frame; and in the quiescent mode, before the modulating operation, scaling down the amplitudes of the symbols of each encoded frame by the scaling factor;

wherein the forwarding operation, in the quiescent mode, comprises transmitting each modulated frame from the modulating operation.

20. The transmitting apparatus of claim 17, wherein the sequence of operations further comprises:

in the quiescent mode, after the modulating step, generating the selected number of instances of the multicarrier time-domain frames corresponding to one instance of the modulating step; and in the quiescent mode, after the modulating step, scaling down the amplitudes of the symbols of each multicarrier time-domain frame by the scaling factor.

21. The transmitting apparatus of claim 17, wherein the selected number of instances is greater than or equal to the square of the scaling factor.

22. The transmitting apparatus of claim 17, wherein the sequence of operations further comprises:

during the forward operation in the normal operating mode, transmitting a scale factor, a repetition factor, and a frame identifier in an overhead channel;

wherein the forwarding operation in the quiescent mode is performed beginning with a frame corresponding to the frame identifier, responsive to receiving an acknowledgement of the transmitted scale factor, repetition factor, and frame identifier.

\* \* \* \* \*